Patented Apr. 30, 1929.

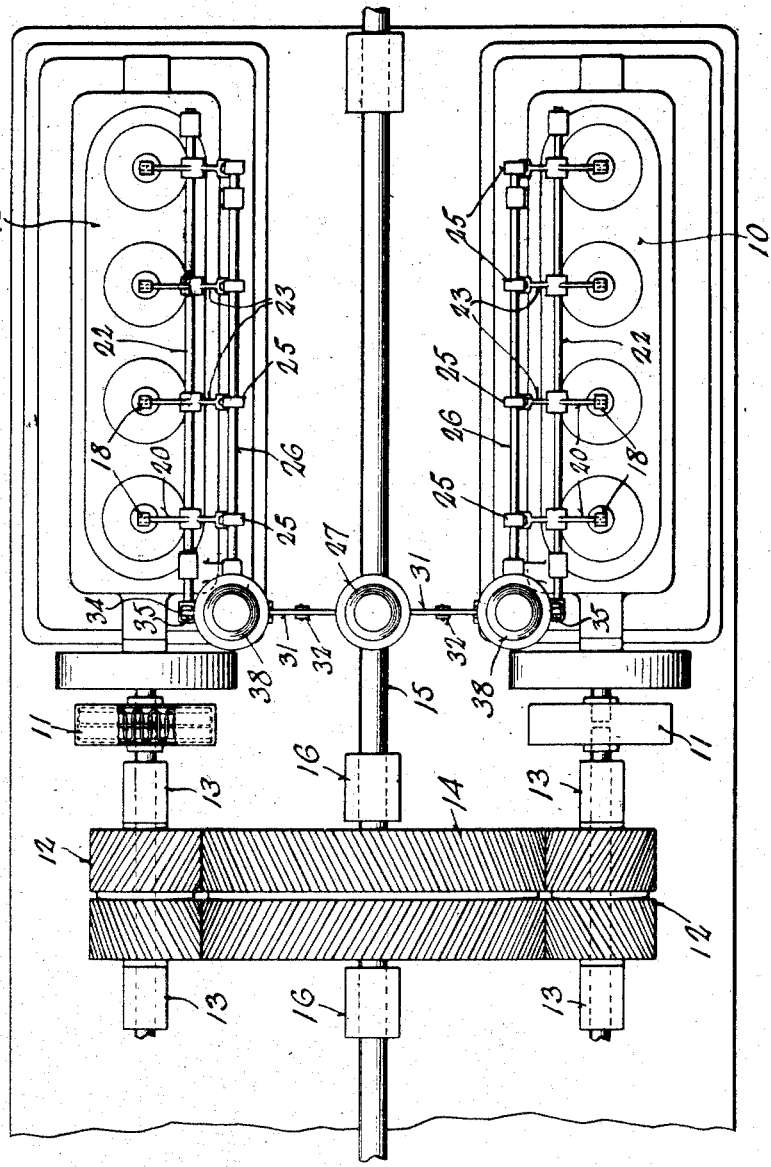

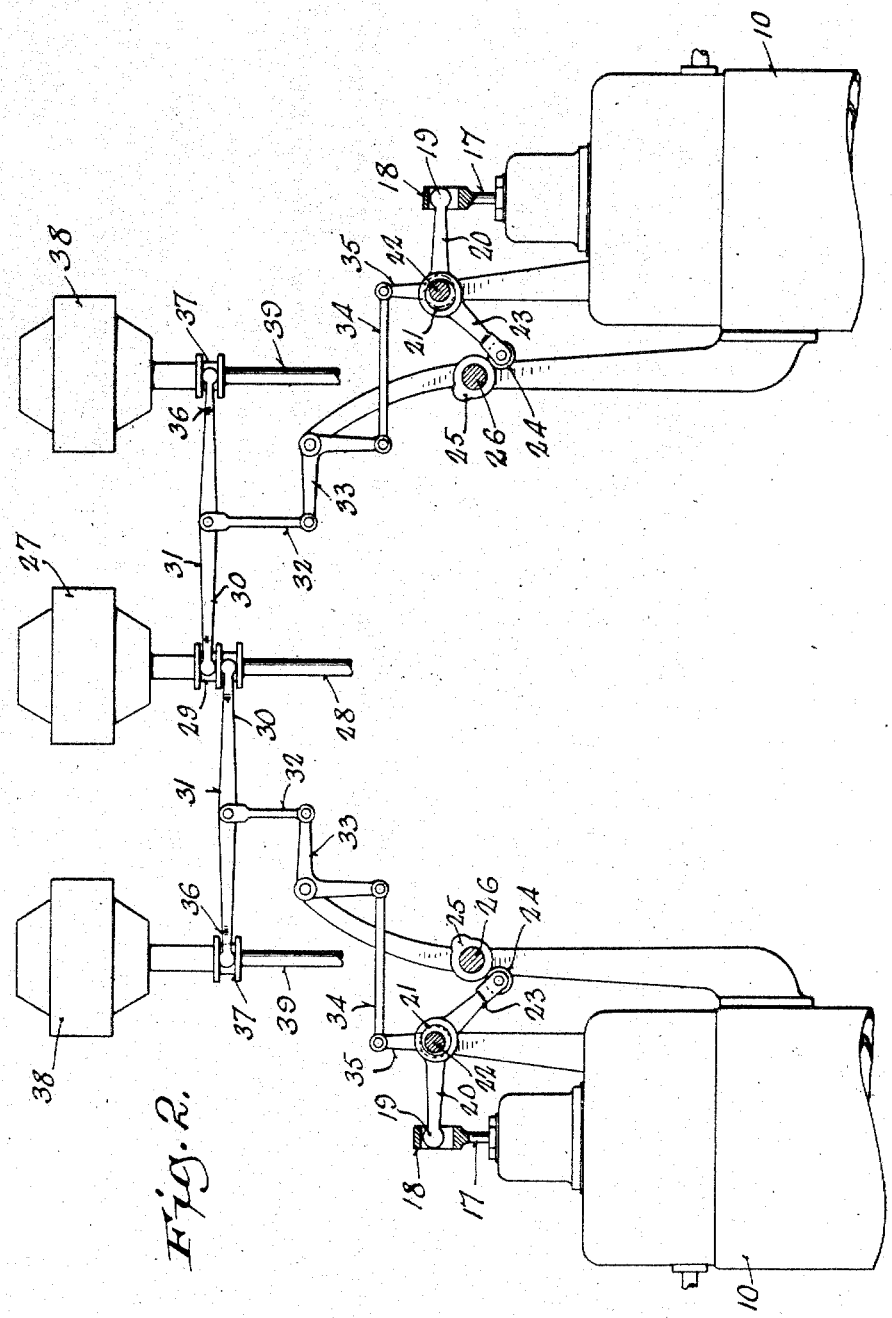

1,710,962

UNITED STATES PATENT OFFICE.

OTTO A. BANNER, OF MILWAUKEE, WISCONSIN.

OIL-ENGINE POWER PLANT.

Application filed May 26, 1924, Serial No. 715,878, and in Germany May 29, 1923.

This invention relates to oil engine power plants and, more particularly, to controls therefor.

In the operation of power plants of the type involving two or more oil engines connected in driving relation with a single main shaft, it is highly desirable that the supply of fuel to all the engines be placed under the control of a single unit so that they will respond uniformly during normal operation. In marine installations, for instance, a propeller shaft tends to race when the propeller is lifted out of the water in heavy seas. By placing the supply of fuel to each of the several engines under the control of mechanism responsive to the speed of this shaft, the supply of fuel to each of the engines may be simultaneously reduced with an increase of speed of this shaft, thus avoiding this tendency to race. It is also desirable to provide separate automatic controls for each of the engines so as to prevent racing of an individual engine in case of accident. By the use of such individual controls a break occurring in the driving connection between an engine and the driven shaft will not result in serious consequences.

One object of the present invention is to provide a system of control for satisfactorily taking care of these contingencies.

An illustrative embodiment of the present invention is illustrated in the accompanying drawings, in which:

Figure 1 is a diagrammatic plan view of an oil engine power plant embodying the novel features of the present invention.

Figure 2 is a view diagrammatically illustrating a system of control therefor.

The power plant shown comprises two four-cylinder oil engines 10 having separate crank shafts each connected through a flexible coupling 11 with a pinion 12. The pinions 12 are mounted in fixed bearings 13 and mesh with a main gear 14 fixed to a main driven shaft 15 journaled in fixed bearings 16. The supply of fuel to each engine cylinder is controlled by a separate valve of usual construction having a valve stem represented at 17. The valve stem shown is provided with a vertically slotted head 18 loosely embracing the head 19 of an actuating lever 20. Lever 20 constitutes one arm of a bell crank rockably mounted upon an eccentric 21 fixed to a rockable fulcrum shaft 22. The other arm 23 of the bell crank carries a roller 24 which bears upon a cam 25 on a cam shaft 26 driven in the usual manner. The arrangement is such that by rocking the fulcrum shaft in one direction or another from the position shown, each of the several eccentrics 21 thereon are rocked so as to raise or lower each of the several bell cranks to thereby modify the action of each of the several valves 17 and increase or diminish the supply of fuel to the several engine cylinders.

In this instance, the fulcrum shafts 22 of both engines are actuated and controlled by mechanism responsive to the speed of rotation of the main shaft 15. This mechanism includes a main engine governor 27 of the usual type incased as indicated and driven by a vertical shaft 28 operatively connected to the main shaft 15 by the usual mechanism so as to respond to the speed thereof. This governor is connected through a collar 29 with the ends 30 of two floating levers 31. Each lever 31 is connected intermediate its ends through a link 32, bell crank 33 and link 34 with an arm 35 fixed to the fulcrum shaft 22 of one of the engines. The other end 36 of each lever 31 is connected through the usual collar 37 of a similar governor 38. Each governor 38 is driven by a vertical shaft 39 from the crank shaft of one of the engines.

The arrangement is such that the main governor 27 responds at all times to the speed of the main driven shaft 15 and the auxiliary governors 38 respond only to excessive speeds of the individual engines with which they are associated. As the speed of the main shaft increases the governor 27 acts through collar 29 to lift both levers 31. This action of both levers 31 is transmitted through the links 32 and 34, bell cranks 33, and arms 35 to simultaneously rock both fulcrum shafts in such direction as to lower the bell crank arms 20 and simultaneously reduce the supply of fuel to both engines. Should either of the engines tend to exceed a predetermined speed, from any cause, such as a broken coupling or otherwise, its corresponding governor 38 comes into play to lift the corresponding lever 31 and thereby reduce the supply of fuel to that particular engine in the manner similar to that just described.

Various changes may be made in the embodiment of the invention hereinabove described, without departing from or sacrificing any of the advantages of the invention as defined in the appended claims.

I claim:

1. In a multiple engine power plant the combination of a driven shaft, a plurality of separate complete internal combustion engines, gearing between said shaft and engines normally maintaining a definite speed relation therebetween, means responsive to the speed of said shaft for simultaneously varying the supply of fuel to said engines, and separate means for each engine independently operable to automatically limit the speed thereof.

2. In a multiple engine power plant the combination of a driven shaft, a plurality of separte complete internal combustion engines, gearing between said shaft and engines normally maintaining a definite speed relation therebetween, mechanism for each engine for controlling the supply of fuel thereto, a unitary means connected with said control mechanism for regulating the supply of fuel to said engines simultaneously, and separate means connected with the fuel control mechanism of each engine independently operable to automatically limit the speed thereof.

3. In a multiple engine power plant the combination of a driven shaft, a plurality of separate complete internal combustion engines, driving connections between said engines and shaft, mechanism for each engine for controlling the supply of fuel thereto, unitary means connected with said control mechanisms for regulating the supply of fuel to said engines simultaneously, and separate means connected with the fuel control mechanism of each engine for automatically limiting the speed thereof.

4. In a multiple engine power plant the combination of a driven shaft, a plurality of internal combustion engines, yieldable driving connections between said engines and shaft normally maintaining a definite speed relation therebetween, a unitary means operable on said engines to simultaneously vary the supply of fuel thereto, and independently operable means associated with each engine to automatically limit the speed thereof.

In witness whereof, I hereunto subscribe my name May, 1924.

OTTO A. BANNER.